(12) United States Patent
Ren et al.

(10) Patent No.: US 12,394,171 B2
(45) Date of Patent: Aug. 19, 2025

(54) REGION RECOGNITION METHOD, APPARATUS AND DEVICE, AND READABLE STORAGE MEDIUM

(71) Applicant: Tencent Technology (Shenzhen) Company Limited, Guangdong (CN)

(72) Inventors: Yuqiang Ren, Shenzhen (CN); Xingjia Pan, Shenzhen (CN); Weiming Dong, Shenzhen (CN); Xudong Zhu, Shenzhen (CN); Haolei Yuan, Shenzhen (CN); Xiaowei Guo, Shenzhen (CN); Changsheng Xu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 301 days.

(21) Appl. No.: 17/730,717

(22) Filed: Apr. 27, 2022

(65) Prior Publication Data

US 2022/0254134 A1 Aug. 11, 2022

Related U.S. Application Data

(63) Continuation of application No. PCT/CN2021/090152, filed on Apr. 27, 2021.

(30) Foreign Application Priority Data

May 25, 2020 (CN) .................... 202010446547.X

(51) Int. Cl.
*G06V 10/24* (2022.01)
*G06V 10/22* (2022.01)
(Continued)

(52) U.S. Cl.
CPC ............ *G06V 10/242* (2022.01); *G06V 10/22* (2022.01); *G06V 10/25* (2022.01); *G06V 10/32* (2022.01)

(58) Field of Classification Search
CPC ...... G06V 10/242; G06V 10/22; G06V 10/25; G06V 10/32; G06V 10/82; G06V 10/20; G06N 3/045; G06N 3/08
See application file for complete search history.

(56) References Cited

U.S. PATENT DOCUMENTS 10,740,640 B2 8/2020 Liu et al.
2018/0053040 A1 2/2018 Al-Osaimi
2021/0350164 A1* 11/2021 Kim ................. G06V 10/242

FOREIGN PATENT DOCUMENTS

CN 106980895 A * 7/2017 .......... G06N 3/0454
CN 108960230 A 12/2018
(Continued)

OTHER PUBLICATIONS

Kuzminykh, Denis, Daniil Polykovskiy, and Alexander Zhebrak. "Extracting invariant features from images using an equivariant autoencoder." Asian Conference on Machine Learning. PMLR, 2018. (Year: 2018).*

(Continued)

*Primary Examiner* — Amandeep Saini
*Assistant Examiner* — Denise G Alfonso
(74) *Attorney, Agent, or Firm* — Crowell & Moring LLP

(57) ABSTRACT

This application discloses a region recognition method, apparatus, and device, and a readable storage medium, and relates to the field of artificial intelligence. The method includes: acquiring an input image, the input image including image content of a to-be-recognized region; acquiring a first rotation angle of the image content in the input image, the first rotation angle being estimated by using a recognition model; rotating a convolution kernel in the recognition (Continued)

model at the first rotation angle, and performing convolution processing on an image feature of the input image using the rotated convolution kernel to obtain a target feature; recognizing the target feature to obtain region data; and determining, in the input image by using the region data, a target region corresponding to the image content.

20 Claims, 6 Drawing Sheets

(51) Int. Cl.
  *G06V 10/25* (2022.01)
  *G06V 10/32* (2022.01)

(56) References Cited

FOREIGN PATENT DOCUMENTS

| CN | 109034249 A | 12/2018 |
|---|---|---|
| CN | 109165619 A | 1/2019 |
| CN | 109658455 A | 4/2019 |
| CN | 110276345 A | 9/2019 |
| CN | 110276346 A | 9/2019 |
| CN | 111680678 A | 9/2020 |
| WO | WO 2021/238548 A1 | 12/2021 |

OTHER PUBLICATIONS

Zagoruyko, Sergey, and Nikos Komodakis. "Paying more attention to attention: Improving the performance of convolutional neural networks via attention transfer." arXiv preprint arXiv:1612.03928 (2016). (Year: 2016).*

Yamada, Kentaro, et al. "Attention prediction in egocentric video using motion and visual saliency." Advances in Image and Video Technology: 5th Pacific Rim Symposium, PSIVT 2011, Gwangju, South Korea, Nov. 20-23, 2011, Proceedings, Part I 5. Springer Berlin Heidelberg, 2012. (Year: 2011).*

Zhou, Xingyi, Dequan Wang, and Philipp Krähenbühl. "Objects as points." arXiv preprint arXiv:1904.07850 (2019). (Year: 2019).*

Zhou, Y., Shi, J., Yang, X., Wang, C., Wei, S., & Zhang, X. (2019). Rotational objects recognition and angle estimation via kernel-mapping CNN. IEEE Access, 7, 116505-116518. (Year: 2019).*

Pan, Xingjia, et al. "Dynamic refinement network for oriented and densely packed object detection." Proceedings of the IEEE/CVF conference on computer vision and pattern recognition. 2020. (Year: 2020).*

Zhou, Yuanyuan, et al. "Rotational objects recognition and angle estimation via kernel-mapping CNN." IEEE Access 7 (2019): 116505-116518. (Year: 2019).*

International Search Report and Written Opinion for priority application No. PCT/CN2021/090152 dated Jul. 28, 2021, 10p, in Chinese language.

English translation of the International Search Report and Written Opinion for priority application No. PCT/CN2021/090152 dated Jul. 28, 2021, 3p.

Concise Explanation of Relevancy for the Written Opinion for PCT/CN2021/090152.

Search Report and First Office Action for Chinese application No. 202010446547.X dated May 18, 2022, 6p, in Chinese language.

Concise Explanation of Relevancy for C3.

* cited by examiner

REGION RECOGNITION METHOD, APPARATUS AND DEVICE, AND READABLE STORAGE MEDIUM

RELATED APPLICATION

This application is a continuation of International Patent Applicaiton No. PCT/CN2021/090152, filed Apr. 27, 2021 and entitled "REGION RECOGNITION METHOD, APPARATUS AND DEVICE, AND READABLE STORAGE MEDIUM", which claims priority to Chinese Patent Application No. 202010446547.X, entitled "TARGET REGION RECOGNITION METHOD, APPARATUS, AND DEVICE, AND READABLE STORAGE MEDIUM" and filed with the China National Intellectual Property Administration on May 25, 2020, both of which are incorporated herein by reference in their entireties.

TECHNICAL FIELD

Embodiments of this application relate to the field of artificial intelligence, and in particular to a region recognition method, apparatus, and device, and a readable storage medium.

BACKGROUND

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. A neural network model is an implementation of artificial intelligence. Application of the neural network model is becoming wider. For example, recognizing, by using the neural network model, a region corresponding to image content in an image is an application of the neural network model.

SUMMARY

Embodiments of this application provide a region recognition method, apparatus, and device, and a readable storage medium, which can improve recognition accuracy of a region corresponding to image content. The technical solutions are as follows.

According to an aspect, a region recognition method is provided, where the method includes:
  acquiring an input image, the input image comprising image content of a to-be-recognized region;
  acquiring a first rotation angle of the image content in the input image, the first rotation angle being estimated by a recognition model, and the first rotation angle representing a tilt angle of the image content in the input image relative to a reference angle;
  rotating a convolution kernel in the recognition model at the first rotation angle;
  performing convolution processing on an image feature of the input image using the rotated convolution kernel to obtain a target feature;
  recognizing the target feature to obtain region data corresponding to the image content; and
  determining, in the input image by using the region data, a target region corresponding to the image content.

According to another aspect, a region recognition apparatus is provided, where the apparatus includes:

an acquiring module, configured to acquire an input image, the input image including image content of a to-be-recognized region;
  a prediction module, configured to acquire a first rotation angle of the image content in the input image, the first rotation angle being estimated by using a recognition model, and the first rotation angle being used for indicating a tilt angle of the image content in the input image relative to a reference angle;
  a processing module, configured to rotate a convolution kernel in the recognition model at the first rotation angle, and perform convolution processing on an image feature of the input image at the rotated convolution kernel to obtain a target feature; and
  a recognition module, configured to recognize the target feature to obtain region data corresponding to the image content; and determine, in the input image by using the region data, a target region corresponding to the image content.

According to another aspect, a computer device is provided. The computer device includes a processor and a memory in communication with the processor, the memory storing at least one instruction, at least one segment of program, a code set, or an instruction set, and the processor being configured to load and execute the at least one instruction, at least one segment of program, code set, or instruction set to cause the computer device to perform steps comprising:
  acquiring an input image, the input image comprising image content of a to-be-recognized region;
  acquiring a first rotation angle of the image content in the input image, the first rotation angle being estimated by a recognition model, and the first rotation angle representing a tilt angle of the image content in the input image relative to a reference angle;
  rotating a convolution kernel in the recognition model at the first rotation angle;
  performing convolution processing on an image feature of the input image using the rotated convolution kernel to obtain a target feature;
  recognizing the target feature to obtain region data corresponding to the image content; and
  determining, in the input image by using the region data, a target region corresponding to the image content.

According to another aspect, a non-transitory computer-readable storage medium is provided. The non-transitory computer-readable storage medium stores at least one instruction, at least one segment of program, a code set, or an instruction set, and the at least one instruction, at least one segment of program, code set, or instruction set being loaded and executed by a processor to cause a computer device to perform steps comprising:
  acquiring an input image, the input image comprising image content of a to-be-recognized region;
  acquiring a first rotation angle of the image content in the input image, the first rotation angle being estimated by a recognition model, and the first rotation angle representing a tilt angle of the image content in the input image relative to a reference angle;
  rotating a convolution kernel in the recognition model at the first rotation angle;
  performing convolution processing on an image feature of the input image using the rotated convolution kernel to obtain a target feature;
  recognizing the target feature to obtain region data corresponding to the image content; and determining, in the input image by using the region data, a target region corresponding to the image content.

According to another aspect, a computer device is provided, including a processor and a memory, the memory storing at least one instruction, at least one segment of program, a code set, or an instruction set, and the at least one instruction, at least one segment of program, code set, or instruction set being loaded and executed by the processor to enable the computer device to implement the region recognition method according to any one of the foregoing embodiments of this application.

According to another aspect, a non-transitory computer-readable storage medium is provided, storing at least one instruction, at least one segment of program, a code set, or an instruction set, and the at least one instruction, at least one segment of program, code set, or instruction set being loaded and executed by a processor to enable a computer to implement the region recognition method according to any one of the foregoing embodiments of this application.

According to another aspect, a computer program or a computer program product is provided. When the computer program or the computer program product runs on a computer, the computer performs the region recognition method according to any one of the foregoing embodiments of this application.

The technical solutions provided in the embodiments of this application include at least the following beneficial effects:

After a rotation angle of image content is determined by using a recognition model, an image feature of an input image is processed in a rotational convolution manner, so as to recognize a target region corresponding to the image content in the input image. In this manner, the target region is a region obtained in the rotational convolution manner, and the rotation angle is combined in a process of recognizing the target region corresponding to the image content, thereby improving recognition accuracy of the target region corresponding to the image content.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art can still derive other drawings from these accompanying drawings without creative efforts.

DESCRIPTION OF EMBODIMENTS

Figure 1:
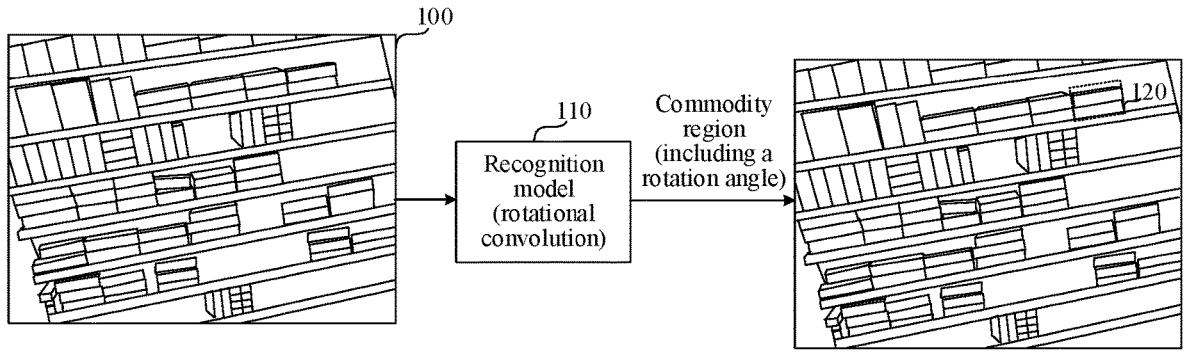
FIG. 1 is a schematic diagram of a result of region recognition according to an exemplary embodiment of this application.

To make objectives, technical solutions, and advantages of this application clearer, the following further describes implementations of this application in detail with reference to the accompanying drawings.

In a related technology, when a region corresponding to image content in an image is recognized by using a neural network model, a sampling location offset of a convolution kernel is estimated to change a sampling location of the convolution kernel, so that convolution processing is performed on an image feature by using a convolution kernel obtained after the sampling location is changed, and the processed feature is recognized to obtain the region corresponding to the image content.

However, the image content is generally arranged at an irregular angle in the image, and for some image content that is arranged at various angles in the image, when regions corresponding to the image content are recognized in the foregoing manner, the angle cannot be combined in a recognition process, and consequently, recognition accuracy is relatively low.

First, terms involved in the embodiments of this application are briefly introduced.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. AI is to study design principles and implementation methods of various intelligent machines to enable the machines to have functions of perception, reasoning, and decision-making.

The AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

Computer vision (CV) is a science that studies how to enable a machine to "see". Further, it means that a camera and a computer are used for replacing human eyes to identify, track, and measure a target, and further perform graphic processing to make the computer process a better image for human eye observation or transmission to an instrument for detection. As a scientific discipline, computer vision studies relevant theories and techniques in an attempt to establish an artificial intelligence system capable of acquiring information from images or multidimensional data. The computer vision technology generally includes technologies such as image processing, image recognition, image semantic understanding, image retrieval, optical character recognition (OCR), video processing, video semantic understanding, video content/behavior recognition, 3D object reconstruction, 3D technology, virtual reality, augmented reality, synchronous locating, and map construction, and further includes a common biometric feature recognition technology such as face recognition and fingerprint recognition.

Machine learning (ML) is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

Rotational convolution: indicates a manner in which convolution processing is performed on an image feature by rotating a convolution kernel. For example, for image content A in an image, first, a rotation angle of the image content A in the image is estimated, and after a convolution kernel is rotated by using the rotation angle obtained by means of prediction, convolution processing is performed on the image feature by using the rotated convolution kernel to obtain a target feature, and a region in which the image content A is located is recognized according to the target feature.

With reference to the introduction to the foregoing nouns, an application scenario of the embodiments of this application is described by using an example.

First, in an unmanned shelf application scenario, a commodity on the shelf needs to be recognized, so as to determine a commodity arrangement density and a commodity arrangement location. However, because a camera disposed above the unmanned shelf is configured to collect images of different commodities, there are different angles. For example, when the camera captures a left commodity, the commodity is tilted in the upper left corner toward the lower right corner, and when the camera captures the right commodity, the commodity is tilted in the upper right corner toward the lower left corner. According to the method provided in this embodiment of this application, after an unmanned shelf image photographed by a camera is inputted into a recognition model, a rotation angle of a commodity in the image is obtained, and after feature processing is performed on an image feature in a rotational convolution manner, a target feature is obtained, and a commodity region is further determined according to the target feature. When the commodity region is marked, the commodity region is recognized with reference to a rotation angle, so that the commodity region is more accurately recognized and marked. Schematically, the unmanned shelf refers to a shelf in an intelligent supermarket.

For example, referring to FIG. 1, a commodity shelf image 100 is inputted into a recognition model 110, and after the recognition model 110 performs rotational convolution processing on an image feature of the commodity shelf image 100, a commodity in the commodity shelf image 100 and a rotation angle of the commodity are recognized, and the commodity in the commodity shelf image 100 is marked with reference to the rotation angle, as shown in a mark box 120.

Second, in a scene content review application scenario, flag content is reviewed as an example for description, and a flag on a street is recognized, so as to determine whether a flag disposed on the street meets a requirement. However, because the flags are arranged at different locations of the street and are displayed in a flying state, different flags are displayed at different angles when shooting the street from a camera perspective. According to the method provided in this embodiment of this application, after a street image photographed by a camera is inputted into a recognition model, a rotation angle of a flag in the image is obtained, and after feature processing is performed on an image feature in a rotational convolution manner, a target feature is obtained, and a commodity region is further determined according to the target feature. When the flag region is marked, the flag region is recognized with reference to a rotation angle, so that the flag region in the street is more accurately recognized and marked. In the foregoing, the flag content is reviewed only as an example. In some embodiments, in addition to reviewing the flag content, logo content and badge content can also be reviewed. The principles of reviewing the logo and badge content are the same as those of reviewing the flag content.

The foregoing two application scenarios are merely exemplary examples of this application. The region recognition method provided in this embodiment of this application may be further applied to another solution for determining, by using rotational convolution, a target region corresponding to image content in an image. This is not limited in this embodiment of this application.

The region recognition method provided in this embodiment of this application may be performed by a computer device, and the computer device includes a terminal or a server. That is, the method provided in this embodiment of this application may be implemented by a terminal, may be implemented by a server, or may be implemented by a terminal and a server in cooperation. For example, the terminal includes at least one of a smartphone, a tablet computer, a portable laptop computer, a desktop computer, an intelligent sound box, an intelligent wearable device, or the like. The server is a physical server, or a cloud server that provides a cloud computing service, and the server can be implemented as one server, or a server cluster or a distributed system that includes multiple servers. For example, when the terminal and the server cooperate to implement the solutions provided in the embodiments of this application, the terminal and the server can be directly or indirectly connected in a wired or wireless communication manner, which is not limited in the embodiments of this application.

Figure 2:
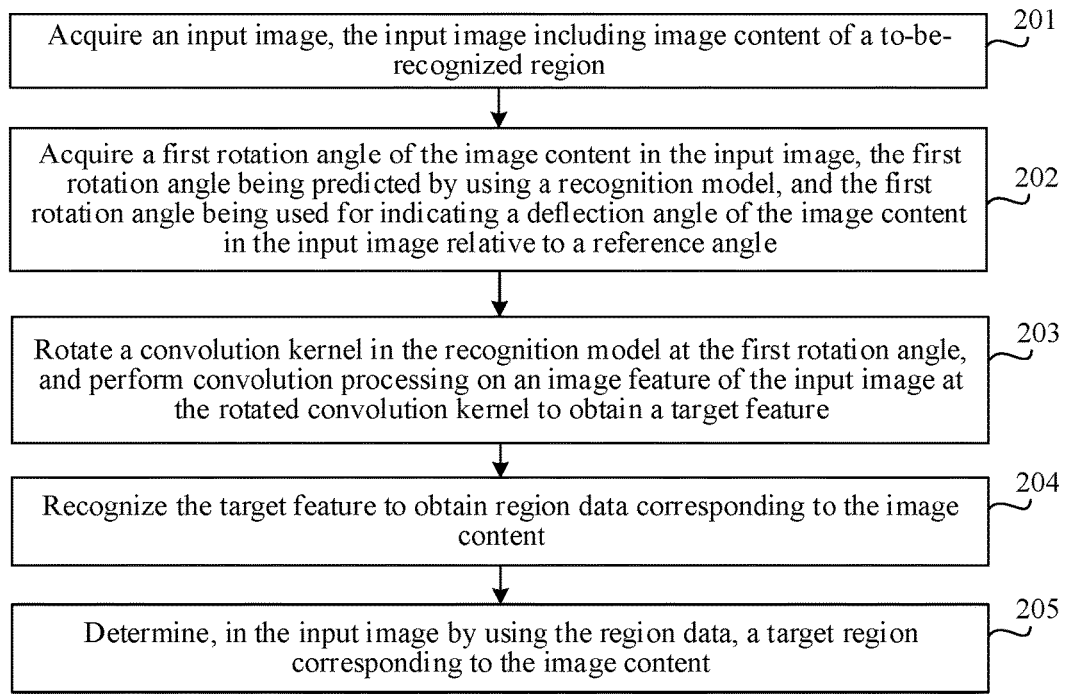
FIG. 2 is a flowchart of a region recognition method according to an exemplary embodiment of this application.

With reference to the foregoing noun introductions and application scenarios, the region recognition method provided in this embodiment of this application is described, and the method is applied to a server as an example. As shown in FIG. 2, the method includes the following steps.

Step 201: Acquire an input image, the input image including image content of a to-be-recognized region.

Exemplarily, the input image is a to-be-recognized image in a region corresponding to the image content. A manner of acquiring the input image by the server includes but is not limited to: receiving, by the server, the input image uploaded by a terminal; extracting, by the server, the input image from an image library; acquiring, by the server, the input image collected by an image collection device, and the like. In addition, a type of the input image is not limited in this embodiment of this application. For example, the type of the input image is a commodity shelf image, or the type of the input image is a street image, or the like.

For example, if the type of the input image is a commodity shelf image, the image content of the to-be-recognized region included in the input image is a commodity; or if the type of the input image is a street image, the image content of the to-be-recognized region included in the input image is a vehicle.

In some embodiments, there may be one or more pieces of image content of the to-be-recognized region included in the input image. This is not limited in this embodiment of this application. In a case in which there are multiple pieces of image content in the to-be-recognized region included in the input image, a target region corresponding to each image content needs to be recognized.

In a recognition process, the region corresponding to the image content includes box selection recognition on a region in which the image content is located. In an exemplary embodiment, after box selection recognition is performed on the region in which the image content is located, at least one of an object recognition manner, a character recognition manner, a type recognition manner, or the like is performed on the image content from the box selection region. In an exemplary embodiment, after box selection recognition is performed on a region in which the image content is located, the box selection region is marked in the image, so as to indicate a region location of the image content in the image.

For example, in this embodiment, an unmanned shelf application scenario is used as an example for description. In this case, the input image is an image acquired by a camera disposed on a peripheral side of the unmanned shelf. The camera is disposed on the peripheral side of the unmanned shelf, image acquisition is performed on multiple unmanned shelves in turn, and image acquisition is completed at different angles for different shelves. Therefore, different angles are presented in images acquired for commodities on different shelves, that is, not all commodities can present a front rectangular shape in the images.

For example, in this embodiment, a search by picture scenario in a shopping application is used as an example for description. A user takes a picture of a commodity that needs to be searched in a shopping application, uploads the picture to a server of the shopping application, and the server recognizes, according to the photo uploaded by the user, image content that needs to be searched by the user from the photo, and searches a commodity library after a box selection. For example, after the user takes a picture of trousers that need to be purchased, the user uploads the picture to the server, and after the server performs box selection for recognizing the trousers in the photo, performs a commodity search on the trousers in the box selection region, and feeds back a search result and a box selection result to the user, so that the user determines whether the box selection region is correct and the search result includes the trousers that need to be purchased.

Step 202: Acquire a first rotation angle of the image content in the input image, the first rotation angle being estimated by using a recognition model, and the first rotation angle being used for indicating a tilt angle of the image content in the input image relative to a reference angle.

The first rotation angle is an angle that is estimated by using the recognition model and that is used for indicating a tilt angle of the image content relative to the reference angle in the input image. The reference angle is set according to experience or flexibly adjusted according to an application scenario, which is not limited in this embodiment of this application.

Exemplarily, the first rotation angle of the image content in the input image is estimated by using the recognition model. In some embodiments, a process of predicting the first rotation angle of the image content in the input image by using the recognition model is: performing feature extraction on the input image by using the recognition model to obtain an image feature of the input image; and predicting the first rotation angle of the image content in the input image based on the image feature of the input image.

Exemplarily, the first rotation angle is used as a rotation angle in final region data; or after rotational convolution processing is performed on the image feature with reference to the first rotation angle, a second rotation angle is obtained according to the generated target feature, and the second rotation angle is used as the rotation angle in the region data.

Step 203: Rotate a convolution kernel in the recognition model at the first rotation angle, and perform convolution processing on an image feature of the input image at the rotated convolution kernel to obtain a target feature.

The convolution kernel is used for performing convolution processing on the image feature. In this embodiment of this application, the convolution kernel is first rotated, and then convolution processing is performed on the image feature by using the rotated convolution kernel. This processing manner is referred to as a rotational convolution manner.

Exemplarily, the recognition model is a deep learning model, and the recognition model is a neural network model.

Exemplarily, the recognition model is a model obtained by training a sample image in advance. Exemplarily, the sample image is an image in an open rotation target data set, the rotation target data set is used as a training data set to train the recognition model, an image in the training data set is marked with a target box, and the target box is a rotation box marked with a rotation angle. Exemplarily, for an image with a relatively large pixel, first, overlapping cutting is performed on the image according to a development package to obtain sub-images with proper scales, and a recognition model is trained and tested by using the sub-images. In a test phase, test results of the sub-images are combined.

Exemplarily, in training the recognition model, a convolutional layer model parameter w and an offset parameter b of a neural network model are solved by using the Adam gradient descent method. In each iteration process, a prediction result error is calculated and propagated back to the neural network model, a gradient is calculated, and parameters in the neural network model are updated.

Exemplarily, When the target region corresponding to the image content is recognized, first feature extraction is performed on the input image by using the recognition model to obtain the image feature of the input image, so that after feature processing is performed on the image feature of the input image by using the convolution kernel in the rotational convolution manner, the target feature is obtained.

Exemplarily, during feature processing, feature processing is performed on the image feature of the input image by using the at least two types of convolution kernels in the rotational convolutional manner, and convolutional results of the at least two types of convolution kernels are fused to obtain the target feature. Convolution kernels of different types have different sizes. Exemplarily, there are three types of convolution kernels, and sizes of the three types of convolution kernels are 3×3, 1×3, and 3×1 respectively. Exemplarily, in a case in which the recognition model includes at least two types of convolution kernels, different types of convolution kernels are convolution kernels on different processing branches in the recognition model.

Step 204: Recognize the target feature to obtain region data corresponding to the image content.

The region data is data directly based on which the target region corresponding to the image content is determined in the input image. Exemplarily, the region data includes a rotation angle, and the rotation angle is used for indicating a tilt angle of the image content relative to the reference angle in the input image. Schematically, the reference angle in the input image is an angle in a direction along a side of the input image, and the rotation angle is a tilt angle of the image content relative to the side of the input image. The rotation angle included in the region data may refer to the first rotation angle obtained in step 202, or may refer to another rotation angle. This is not limited in this embodiment of this application.

Figure 3:
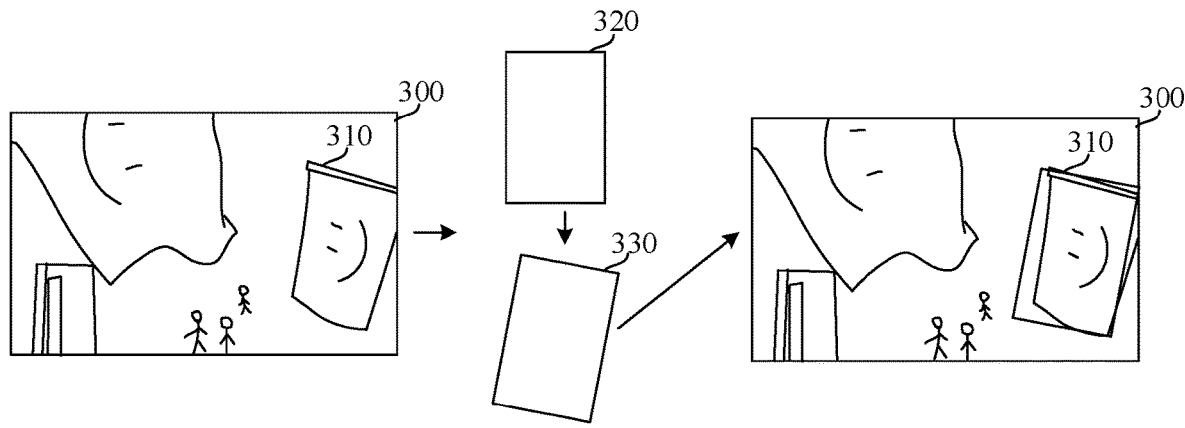
FIG. 3 is a schematic diagram of a process of rotating a selected region according to an embodiment shown in FIG. 2.

For example, referring to FIG. 3, image content 310 is included in an image 300, a box selection region 320 is a region corresponding to a reference angle, and a box selection region 330 is a region that is corresponding to image content 310 and that is obtained after the box selection region 320 is rotated according to a rotation angle included in region data.

Step 205: Determine, in the input image by using the region data, a target region corresponding to the image content.

Exemplarily, the region data includes a rotation angle, and the region data further includes size data and location data. The size data determines a size of the target region corresponding to the image content, and the location data determines a location of the image content in the input image. With reference to the size data, the location data, and the rotation angle, the target region corresponding to the image content in the input image is determined.

Exemplarily, the size data is used for indicating a length and width value of the target region corresponding to image content; and the location data is used for indicating a pixel of the image corresponding to a central point of the image content in the input image. Exemplarily, the central point is corresponding to one pixel or a group of pixels.

In conclusion, according to the target region recognition method provided in this embodiment, after a rotation angle of image content is determined by using a recognition model, an image feature of an input image is processed in a rotational convolution manner, so as to recognize a target region corresponding to the image content in the input image. In this manner, the target region is a region obtained in the rotational convolution manner, and the rotation angle is combined in a process of recognizing the target region corresponding to the image content, thereby improving recognition accuracy of the target region corresponding to the image content.

Figure 4:
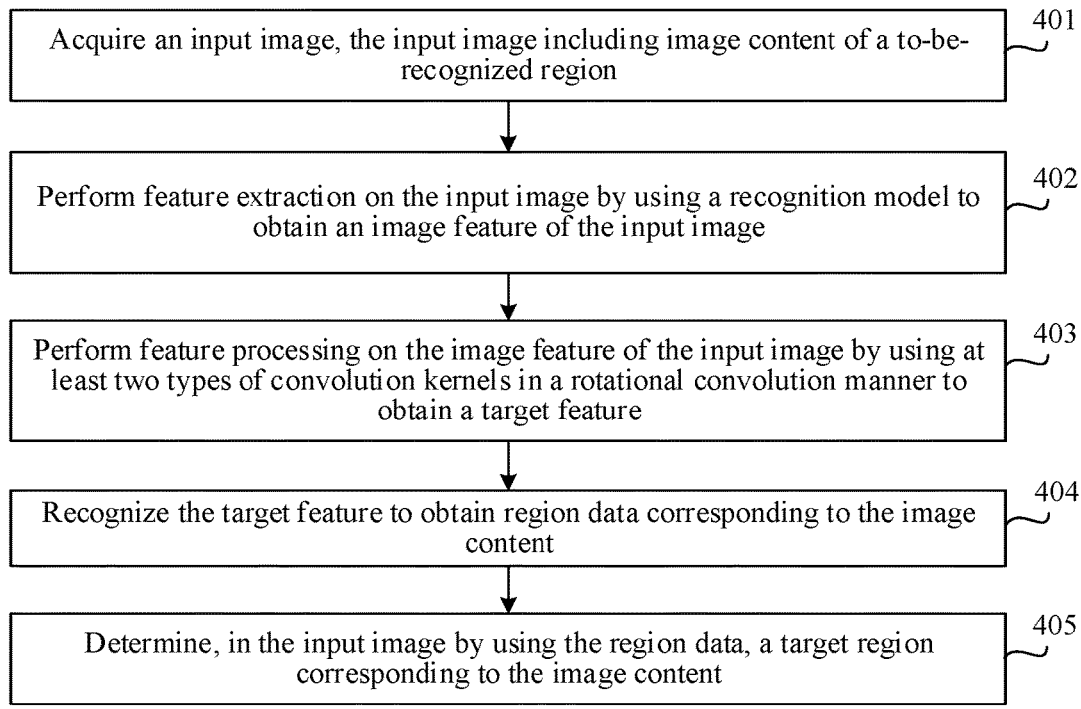
FIG. 4 is a flowchart of a region recognition method according to another exemplary embodiment of this application.

In an exemplary embodiment, there are at least two types of convolution kernels in a recognition model. That is, at least two types of convolution kernel are used for performing rotational convolution processing on an image feature of an input image. FIG. 4 is a flowchart of a region recognition method according to another exemplary embodiment of this application. The method is applied to a server as an example for description. As shown in FIG. 4, the method includes the following steps.

Step 401: Acquire an input image, the input image including image content of a to-be-recognized region.

Exemplarily, the input image is a to-be-recognized image in a region corresponding to the image content, and in a recognition process, the region corresponding to the image content includes box selection recognition on a region in which the image content is located.

Step 402: Perform feature extraction on the input image by using a recognition model to obtain an image feature of the input image.

Exemplarily, an hourglass network is used as a trunk network in the recognition model to perform feature extraction on the input image to obtain the image feature of the input image.

Step 403: Perform feature processing on the image feature of the input image by using at least two types of convolution kernels in a rotational convolution manner to obtain a target feature.

Exemplarily, the recognition model is a dynamic information aggregation module (DIAM), and is configured to extract more accurate and rotation-invariant feature. Exemplarily, the recognition model includes two main parts: (1) an adaptive rotational convolution operator, configured to extract a calibrated feature according to a estimated rotation angle; and (2) an adaptive feature aggregation operator, configured to adaptively aggregate features from receptive fields with different shapes and sizes. That is, when the recognition model recognizes the region corresponding to the image content, the following is correspondingly included: (1) rotational convolution, used for extracting a feature that better matches a rotation target; and (2) multi-channel feature aggregation, used for obtaining a final semantic feature by adaptively aggregating different features with different receptive fields by using an attention mechanism.

Exemplarily, in this embodiment, when feature processing is performed on the image feature of the input image by using at least two types of convolution kernels in the rotational convolution manner, the following case is included: performing feature processing on the image feature of the input image by using two types of convolution kernels in the rotational convolution manner; performing feature processing on the image feature of the input image in the rotational convolution manner by using three types of convolution kernels; and performing feature processing and the like on the image feature of the input image by using four types of convolution kernels in the rotational convolutional manner. In the foregoing example, two, three, and four types of convolution kernels are used as examples for description, and different quantities of convolution kernels may be more. This is not limited in this embodiment of this application.

Exemplarily, an implementation of performing feature processing on the image feature of the input image by using the at least two types of convolution kernels in the rotational convolutional manner to obtain the target feature includes: rotating the at least two types of convolution kernels at a first rotation angle; and performing convolution processing on the image feature of the input image by using the at least two types of rotated convolution kernels to obtain the target feature. Exemplarily, first, the first rotation angle of the image content in the input image is estimated by using the recognition model, and then at least two types of convolution kernels in the recognition model are rotated by using the first rotation angle, and the image feature of the input image is convolution processed by using the at least two types of rotated convolution kernels to obtain the target feature.

Exemplarily, feature processing is performed on the image feature of the input image by using at least two types of convolution kernels in the rotational convolution manner to obtain at least two rotational convolution features, one convolution kernel corresponding to one rotational convolution feature. That is, convolution processing is performed on the image feature of the input image by using the at least two types of rotated convolution kernels to obtain the at least two rotational convolution features.

Exemplarily, a process of performing feature processing on the image feature of the input image in the rotational convolutional manner by using the at least two types of convolution kernels includes: performing channel compression on the image feature of the input image to obtain a compressed image feature; and performing feature processing on the compressed image feature in the rotational convolution manner by using the at least two types of convolution kernels. Exemplarily, the compressed image feature is referred to as a compression feature. First, channel compression is performed on an image feature outputted by an hourglass network by using a convolution kernel of a 1×1 size to obtain the compression feature, and then feature processing is performed on the compression feature in the rotational convolution manner by using at least two types of convolution kernels.

In this embodiment, that feature processing is performed on the image feature of the input image by using three types of convolution kernels in the rotational convolution manner is used as an example for description. For example, a compressed image feature (that is, the foregoing compression feature) is convoluted by using three branches, and each branch uses convolution kernels of different sizes (that is, convolution kernels of different types). For example, a first branch uses a 3×3 convolution kernel, a second branch uses a 1×3 convolution kernel, and a third branch uses a 3×1 convolution kernel, and the convolution kernels of the three branches separately perform rotational convolution processing on the compressed image feature to obtain three rotational convolution features.

Exemplarily, after the at least two rotational convolution features are obtained by using the at least two types of convolution kernels, convolution is performed on the at least two rotational convolution features by using an attention mechanism to generate at least two attention maps, where one attention map corresponds to one rotational convolution feature, and the at least two rotational convolution features and the at least two attention maps are combined to generate the target feature.

Exemplarily, any rotational convolution feature includes a sub-feature corresponding to each pixel, an attention map corresponding to any rotational convolution feature includes an attention value corresponding to each pixel, and an attention value corresponding to any pixel is used for indicating reliability of a sub-feature corresponding to the pixel included in the any rotational convolution feature. Exemplarily, a larger attention value corresponding to any pixel indicates higher reliability of a sub-feature corresponding to the pixel.

Exemplarily, with reference to the at least two rotational convolution features and the at least two attention maps, an implementation of generating the target feature includes: normalizing the at least two attention maps to obtain at least two normalized maps, one normalized map corresponding to one rotational convolution feature; summating products of the at least two rotational convolution features and the corresponding normalized maps to obtain a summation feature; and performing convolution processing on the summation feature to generate the target feature.

Exemplarily, each attention map includes one attention value corresponding to each pixel of the image, and a sum of attention values corresponding to any pixel in each attention map may not be 1. A process of normalizing the at least two attention maps includes: separately normalizing the at least two attention maps for each pixel, so that a sum of attention values that are corresponding to normalized maps and that are obtained for any pixel after normalization is 1.

Exemplarily, the products of the at least two rotational convolution features and the corresponding normalized maps are summated to obtain the summation feature may be considered as a process of performing weighted summation on the at least two rotational convolution features based on the at least two normalized maps, and a weight of a rotational convolution feature in the weighted summation process is a normalized map corresponding to the rotational convolution feature.

Exemplarily, a process of performing convolution processing on the summation feature is performing convolution processing on the summation feature by using the convolution kernel, and a size of the convolution kernel is not limited in this embodiment of this application. Exemplarily, the size of the convolution kernel is 1×1.

Figure 5:
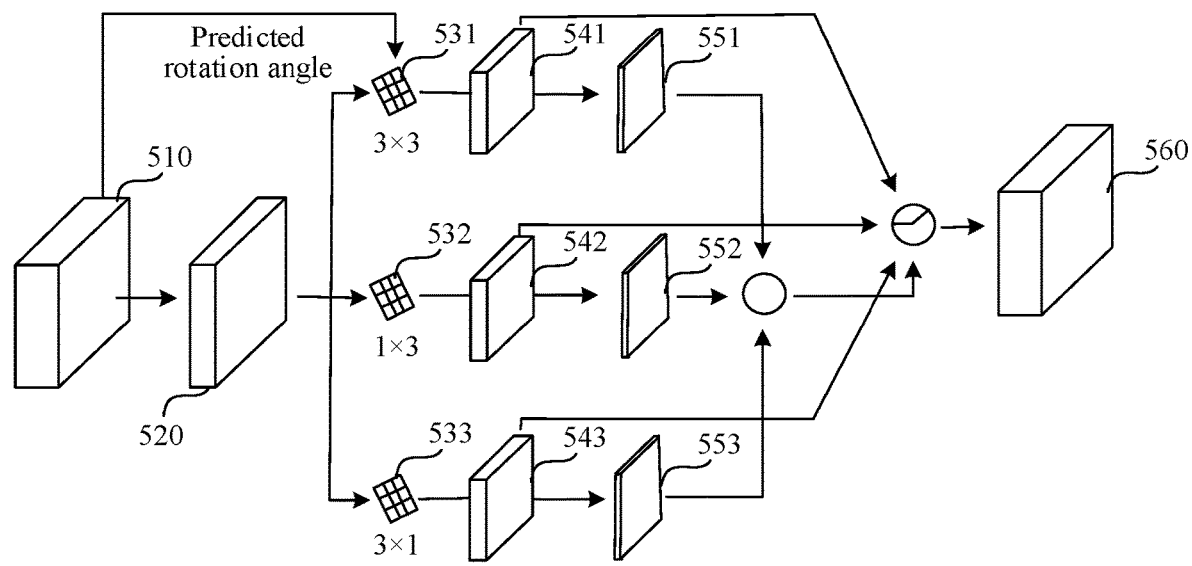
FIG. 5 is a schematic diagram of a recognition process of a recognition model based on the embodiment shown in FIG. 4.

Schematically, referring to FIG. 5, after feature extraction is performed on an input image by using a recognition model, an image feature 510 is obtained, and channel compression is performed on the image feature 510 by using a 1×1 convolution kernel to obtain a compression feature 520. The compression feature 520 is separately rotated by using a first convolution kernel 531 (3×3 convolution kernel), a second convolution kernel 532 (1×3 convolution kernel), and a third convolution kernel 533 (3×1 convolution kernel). In a rotational convolution process, the convolution kernel is first rotated by using an estimated rotation angle, and then the image feature is convoluted by using the rotated convolution kernel.

After rotational convolution is performed on the compression feature 520 by using the first convolution kernel 531, a first rotational convolution feature 541 is generated; after rotational convolution is performed on the compression feature 520 by using the second convolution kernel 532, a second rotational convolution feature 542 is generated; and after rotational convolution is performed on the compression feature 520 by using the third convolution kernel 533, a third rotational convolution feature 543 is generated. Convolution may be performed on the first rotational convolution feature 541, the second rotational convolution feature 542, and the third rotational convolution feature 543 by using an attention mechanism to generate attention maps, where convolution is performed on the first rotational convolution feature 541 by using the attention mechanism to generate a first attention map 551, convolution is performed on the second rotational convolution feature 542 by using the attention mechanism to generate a second attention map 552, and convolution is performed on the third rotational convolution feature 543 by using the attention mechanism to generate a third attention map 553.

The first attention map 551, the second attention map 552, and the third attention map 553 are normalized to obtain three normalized maps, and implement weighted summation of the first rotational convolution feature 541, the second rotational convolution feature 542, and the third rotational convolution feature 543 based on the three normalized maps to obtain a summation feature; and convolution processing is performed on the summation feature to generate a target feature 560.

Exemplarily, hard fusion can also be used for fusing the rotational convolution features of the branches, that is, a maximum value is selected in a pixel-by-pixel location instead of normalization of the attention map, and the rotational convolution feature is selected according to a selection result of the attention map. Exemplarily, a process of acquiring the target feature in a hard fusion manner is: determining, in at least two attention maps, at least two attention values corresponding to one pixel; determining, from the rotational convolution feature corresponding to the target attention map, a sub-feature corresponding to the pixel; and generating the target feature based on the sub-feature corresponding to each pixel. The target attention map is an attention map in which a maximum attention value is located, and the maximum attention value is a maximum value of the at least two attention values. One pixel in this embodiment of this application refers to any pixel in each pixel.

Exemplarily, because each attention map includes one attention value corresponding to each pixel, at least two attention values corresponding to any pixel can be determined in the at least two attention maps. A quantity of attention values corresponding to any pixel is the same as a quantity of attention maps. A maximum value of at least two attention values corresponding to any pixel is used as a maximum attention value, and an attention map in which the maximum attention value is located is used as a target attention map. After the target attention map is determined, the sub-feature corresponding to the any pixel is obtained from the rotational convolution feature corresponding to the target attention map. According to the foregoing described manner of acquiring a sub-feature corresponding to any pixel, a sub-feature corresponding to each pixel can be acquired, and further, a feature that includes a sub-feature corresponding to each pixel is used as the target feature.

Figure 6:
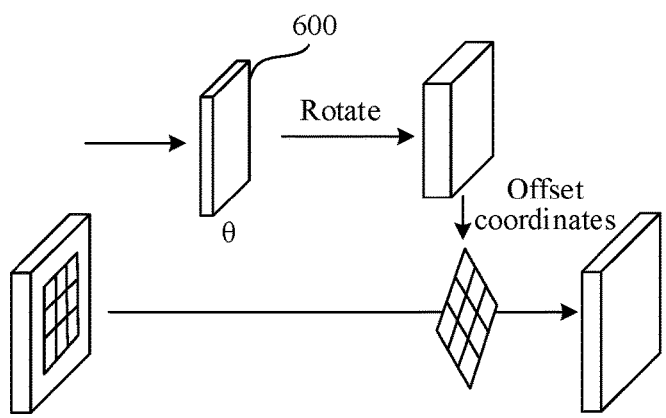
FIG. 6 is a schematic diagram of a rotational convolution process based on the embodiment shown in FIG. 4.

Exemplarily, each branch of a DIAM model (i.e., a recognition model) uses rotational convolution at the beginning. FIG. 6 is a schematic diagram of a rotational convolution process according to an exemplary embodiment of this application. As shown in FIG. 6, according to an estimated rotation angle θ (that is, a first rotation angle), offset coordinates of a sampling location corresponding to a convolution kernel are generated at each pixel location by using a rotation matrix 600, a new sampling location is obtained by adding the offset coordinates to the sampling location, and a convolution operation continues. Exemplarily, the offset coordinates are obtained after an offset situation of the sampling location in the image is analyzed after the convolution kernel is rotated.

Exemplarily, a calculation manner of the offset coordinates is as follows:

$$\delta p_i = M_r(\theta) \cdot p_i - p_i \quad \text{Formula 1:}$$

where $\delta p_i$ represents offset coordinates, θ is a estimated rotation angle, that is, the first rotation angle, $p_i$ represents a sampling location, and $M_r$ represents a convolution kernel obtained after rotation is performed with reference to the estimated rotation angle.

Step 404: Recognize the target feature to obtain region data corresponding to the image content.

Exemplarily, the region data includes the first rotation angle, and a manner of recognizing the target feature to obtain the region data corresponding to the image content includes: recognizing the target feature to obtain size data and location data that are corresponding to the image content; and determining the first rotation angle, the size data, and the location data as the region data corresponding to the image content.

Exemplarily, the region data includes a second rotation angle, and a manner of recognizing the target feature to obtain the region data corresponding to the image content is: recognizing the target feature to obtain the second rotation angle, the size data, and the location data that are corresponding to the image content; and determining the second rotation angle, the size data, and the location data as the region data corresponding to the image content. Exemplarily, the second rotation angle is an angle obtained by re-predicting the target feature, and the first rotation angle and the second rotation angle may be the same or different. This is not limited in this embodiment of this application.

Step 405: Determine, in the input image by using the region data, a target region corresponding to the image content.

Exemplarily, the region data includes a rotation angle, and the region data further includes size data and location data. The size data determines a size of the target region corresponding to the image content, and the location data determines a location of the image content in the input image. With reference to the size data, the location data, and the rotation angle, the target region corresponding to the image content in the input image is determined.

In conclusion, according to the region recognition method provided in this embodiment, after a rotation angle of image content is determined by using a recognition model, an image feature of an input image is processed in a rotational convolution manner, so as to recognize a target region corresponding to the image content in the input image. In this manner, the target region is a region obtained in the rotational convolution manner, and the rotation angle is combined in a process of recognizing the target region corresponding to the image content, thereby improving recognition accuracy of the target region corresponding to the image content.

According to the method provided in this embodiment, multiple branches are designed. Different branches use different sizes of convolution kernels (that is, different types of convolution kernels). In addition, a receptive field is adaptively adjusted according to the shape, size, and rotation angle by means of rotational convolutional, and a feature fusion structure is used, so that neurons of the same layer in a neural network can adaptively adjust the receptive field, and adaptively select receptive fields with different angles, shapes, and sizes, so that recognition of the recognition model is more flexible and a recognition result is more accurate.

Figure 7:
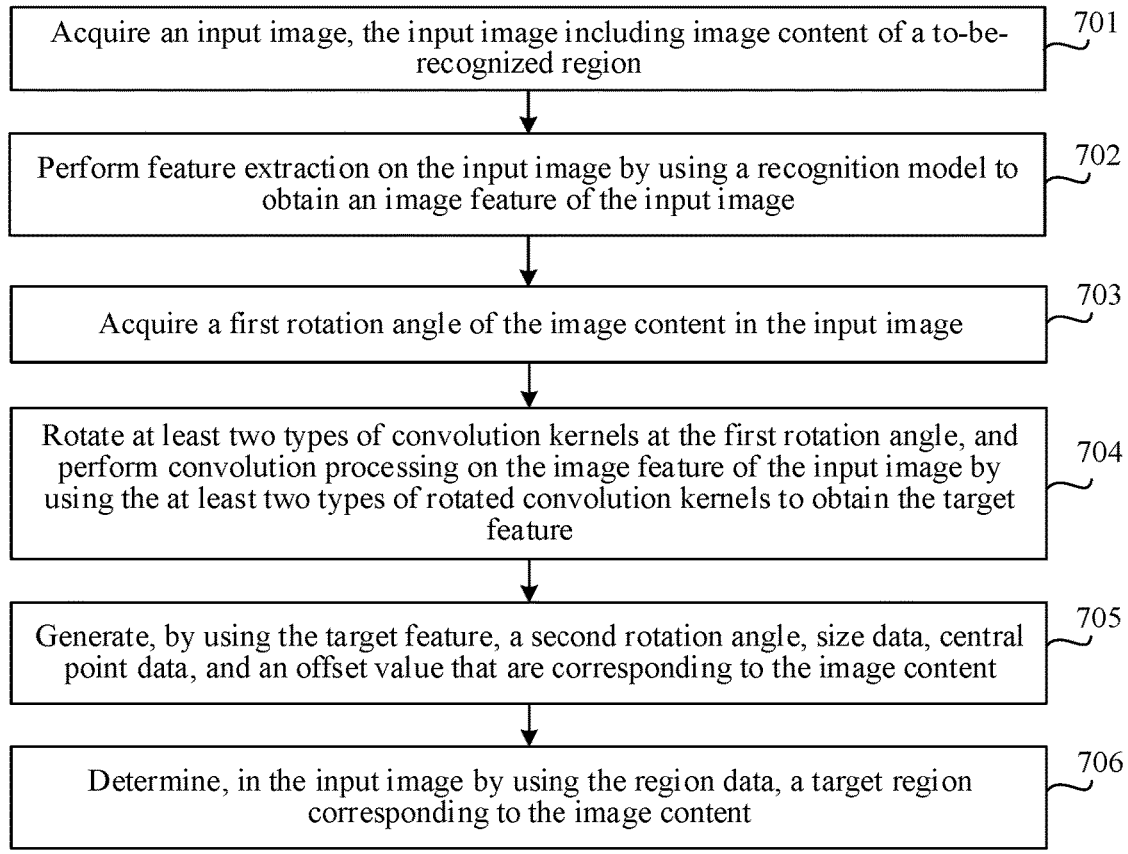
FIG. 7 is a flowchart of a region recognition method according to another exemplary embodiment of this application.

In an exemplary embodiment, the location data includes central point data and an offset value. FIG. 7 is a flowchart of a region recognition method according to another exemplary embodiment of this application. The method is applied to a server as an example for description. As shown in FIG. 7, the method includes the following steps.

Step 701: Acquire an input image, the input image including image content of a to-be-recognized region.

Exemplarily, the input image is a to-be-recognized image in a region corresponding to the image content, and in a recognition process, the region corresponding to the image content includes box selection recognition on a region in which the image content is located.

Step 702: Perform feature extraction on the input image by using a recognition model to obtain an image feature of the input image.

Exemplarily, an hourglass network is used as a trunk network in the recognition model to perform feature extraction on the input image to obtain the image feature of the input image.

Step 703: Acquire a first rotation angle of the image content in the input image.

Exemplarily, the first rotation angle of the image content in the input image is estimated by using the recognition model, and rotational convolution processing is performed on the image feature of the input image according to the estimated first rotation angle.

Step 704: Rotate at least two types of convolution kernels at the first rotation angle, and perform convolution processing on the image feature of the input image by using the at least two types of rotated convolution kernels to obtain the target feature.

In this embodiment, that feature processing is performed on the image feature of the input image by using three types of convolution kernels in the rotational convolution manner is used as an example for description. For example, a compressed image feature is convoluted by using three branches, and convolution kernels of different sizes are used for the branches.

Exemplarily, after the at least two rotational convolution features are obtained by using the at least two types of convolution kernels, convolution is performed on the at least two rotational convolution features by using an attention mechanism to generate at least two attention maps, and the at least two rotational convolution features and the at least two attention maps are combined to generate the target feature. Exemplarily, the at least two attention maps are normalized to obtain at least two normalized maps, one normalized map corresponding to one rotational convolution feature; products of the at least two rotational convolution features and the corresponding normalized maps are summated to obtain a summation feature; and convolution processing is performed on the summation feature to generate the target feature.

Step 705: Generate, by using the target feature, a second rotation angle, size data, central point data, and an offset value that are corresponding to the image content.

Exemplarily, after regression analysis processing is performed on the target feature, the size data corresponding to image content is generated.

Exemplarily, the target feature is recognized and analyzed to obtain the second rotation angle, the size data, and the location data that are corresponding to the image content. The second rotation angle may be the same as or different from the first rotation angle.

The size data is used for indicating length and width data corresponding to the region corresponding to the image content.

The location data includes the central point data and the offset value, where the central point data is used for indicating a pixel location corresponding to a central point in the image content, and the offset value is used for indicating an offset generated by the central point data in an image feature scaling process.

Exemplarily, the central point of the image content is estimated by using the target feature to obtain the central point data, that is, a probability that each pixel belongs to the central point of the image content is outputted with reference to the target feature, and the central point location of the image content is determined according to the probability data corresponding to each pixel. an offset of the central point in an image feature scaling process is estimated by using the target feature to obtain the offset value. The offset value is used for correcting the estimated central point data.

Exemplarily, in a process of determining the region data, the second rotation angle, the size data, and the offset value are corresponding to a regression task, and the central point data is corresponding to a classification task, that is, the second rotation angle, the size data, and the offset value are recognized by regression to a corresponding regression curve. However, the central point data is used for determining, by classifying pixels, whether the pixels belong to the central point for recognition.

Exemplarily, in a process of generating the region data, a recognition process of the region data is corrected by using a dynamic filter, so as to improve accuracy of the region data recognition process. For example, when correction is performed by using the dynamic filter, at least two cases are included as follows:

First, for a classification task, feature correction is performed by using the dynamic filter.

Exemplarily, convolution processing is performed on a reference feature by using the dynamic filter as a convolution kernel to obtain a feature correction amount, where the reference feature is a feature corresponding to an image feature (or the foregoing target feature); and after the reference feature is corrected by using the feature correction amount, a to-be-recognized feature is obtained, and the to-be-recognized feature is classified by using the recognition model to obtain classification data, for example, the foregoing central point data is obtained. Exemplarily, when feature correction is performed by using the dynamic filter, it is implemented that the target feature is corrected by using the dynamic filter, and the corrected target feature is classified to obtain the classification data. Alternatively, it is implemented that the image feature is corrected by using the dynamic filter, and after rotational convolution processing is performed on the corrected image feature, the target feature is generated, and the target feature is classified to obtain the classification data.

Exemplarily, in a feature correction process, a first hyperparameter is further included, the first hyperparameter is used for limiting a correction upper limit of the feature correction amount, and the reference feature is corrected by using the first hyperparameter and the feature correction amount to obtain a to-be-recognized feature.

For a calculation process of the feature correction amount, refer to the following formula 2:

$$F_\Delta = F_{mid} \times K_c \quad \text{Formula 2:}$$

where $F_\Delta$ is used for indicating a feature correction amount, $F_{mid}$ is used for indicating a reference feature, and $K_c$ indicates a dynamic filter. The reference feature is a feature corresponding to the image feature, for example, the reference feature is a feature obtained after image feature compression processing, or the reference feature is a feature obtained after image feature amplification processing is performed.

For a feature correction process, refer to the following formula 3:

$$H_c = C((1 + \varepsilon \times F_{66}/\|F_\Delta\|) \times F_{mid}; \Phi \quad \text{Formula 3:}$$

where $H_c$ represents a corrected to-be-recognized feature, C represents a classifier, that is, the last-layer convolution, $\varepsilon$ represents a first hyperparameter, $F_\Delta$ is used for indicating a feature correction amount, $F_{mid}$ is used for indicating a reference feature, and $\Phi$ is a parameter in the classifier. Exemplarily, a value of $\varepsilon$ is preset. For example, in this embodiment, ε is set to 0.1, and is used for limiting a correction upper limit of the feature correction amount.

For example, each pixel is recognized by using the foregoing feature correction manner, and a probability that each pixel belongs to the central point and a probability that each pixel does not belong to the central point are determined. For example, after a pixel A is classified by using the recognition model, it is obtained that a probability that the pixel A belongs to the central point is 0.1, and a probability that the pixel A does not belong to the central point is 0.9.

Second, for a regression task, result correction is performed by using the dynamic filter.

Exemplarily, convolution processing is performed on a reference feature by using the dynamic filter as a convolution kernel to obtain a result correction amount, where the reference feature is a feature corresponding to an image feature (or the foregoing target feature); and regression analysis is performed on the reference feature by using the recognition model to obtain a regression analysis result, and the regression analysis result is corrected by using the result correction amount to obtain regression type data, for example, the foregoing second rotation angle, size data, and offset value are obtained. Exemplarily, when result correction is performed by using the dynamic filter, it is implemented that the result correction amount corresponding to the image feature is generated by using the dynamic filter. Alternatively, the result correction amount corresponding to the target feature is generated by using the dynamic filter.

Exemplarily, in a result correction process, a second hyperparameter is further included, and the second hyperparameter is used for limiting a correction upper limit of the result correction amount. The second hyperparameter and the result correction amount are used for correcting the regression analysis result to obtain the regression type data.

For a calculation process of the result correction amount, refer to the following formula 4:

$$H_\Delta = F_{mid} \times K_r \quad \text{Formula 4:}$$

where $H_\Delta$ is used for indicating a result correction amount, $F_{mid}$ is used for indicating a reference feature, and $K_r$ indicates a dynamic filter. The reference feature is a feature corresponding to the image feature, for example, the reference feature is a feature obtained after image feature compression processing, or the reference feature is a feature obtained after image feature amplification processing is performed.

For a result correction process, refer to the following formula 5:

$$H_r = (1 + \delta \times \tanh(H_\Delta)) \times H_b \quad \text{Formula 5:}$$

where $H_r$ represents corrected regression type data, δ represents a second hyperparameter, $H_b$ represents a regression analysis result, and $H_\Delta$ is used for indicating a result correction amount. Exemplarily, a value of δ is preset.

Step 706: Determine, in the input image by using the region data, a target region corresponding to the image content.

Exemplarily, the region data includes a rotation angle, size data, and location data. The size data determines a size of the target region corresponding to the image content, and the location data determines a location of the image content in the input image. A rotation status of the image content in the input image is determined by using the rotation angle.

Exemplarily, the location data includes central point data and an offset value. After the region data is determined for the input image, the center location is first selected from the input image according to the central point data and the offset value; a first region is determined from the input image according to the center location and the estimated size data (that is, the length and width of the target region); and the first region is rotated according to the rotation angle included in the region data to obtain a final target region. For example, the first region is a region that does not include a rotation angle.

Figure 8:
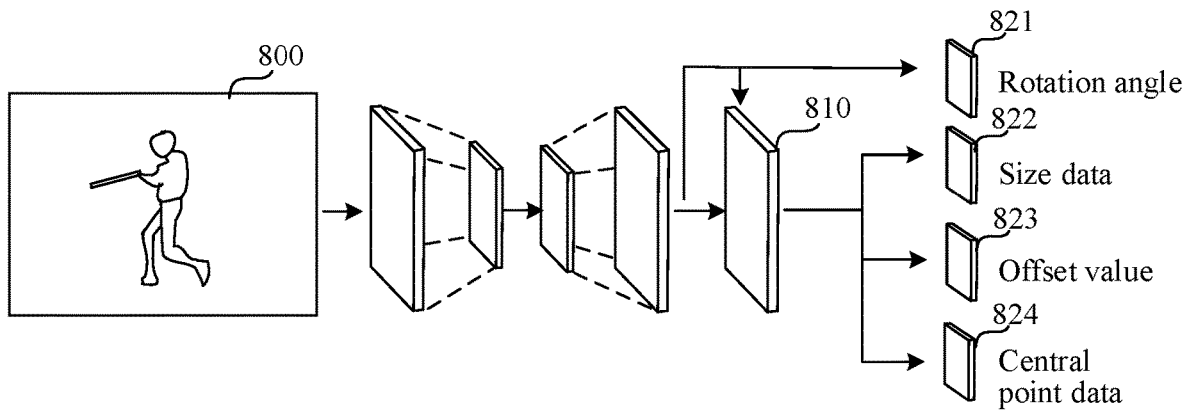
FIG. 8 is a schematic diagram of an implementation process of an overall solution according to the embodiment shown in FIG. 7.

For example, referring to FIG. 8, after feature extraction is performed on an image 800, rotational convolution processing is performed on an extracted feature to finally obtain a target feature 810, and recognition is performed according to the target feature 810 to obtain a rotation angle 821, size data 822, an offset value 823, and central point data 824.

For example, in a process of performing target detection based on a related technology and performing target detection based on this application, accuracy of the target detection is shown in the following Table 1:

TABLE 1

| Target detection algorithm | CP | BL2 | RC1 | RRD | RoI Trans | This application |
|---|---|---|---|---|---|---|
| Average accuracy of all types (mAP) | 55.7 | 69.6 | 75.7 | 84.3 | 86.2 | 92.7 | mAP is a target detection field in machine learning, is an indicator used for measuring performance of a target detection algorithm, and represents average accuracy of all types. CP is used for representing a high-performance simple target detection algorithm based on the Compact CNN. RC1 is an algorithm that uses selective search to extract candidate regions of different sizes and different shapes from an input image, selects a trained depth learning classification model, cuts off an output layer, converts a candidate region type into a fixed shape required for network input, obtains a feature map of each candidate region, classifies the feature map by using a classifier, and matches the feature map with a location label. RRD is a rotation-sensitive regression detection algorithm. RoI Trans is an algorithm for feature extraction in a Roi-pooling manner.

It may be learned from Table 1 that, based on the region recognition method provided in this embodiment of this application, average accuracy of all types achieved in the target detection field is relatively high, and mPA is significantly improved.

In conclusion, according to the region recognition method provided in this embodiment, after a rotation angle of image content is determined by using a recognition model, an image feature of an input image is processed in a rotational convolution manner, so as to recognize a target region corresponding to the image content in the input image. In this manner, the target region is a region obtained in the rotational convolution manner, and the rotation angle is combined in a process of recognizing the target region corresponding to the image content, thereby improving recognition accuracy of the target region corresponding to the image content.

According to the method provided in this embodiment, when determining a location of image content, an offset generated by a central point in a scaling process of an image feature is determined by determining a central point location and an offset value of the image content, so as to correct the central point location by using the offset value, thereby improving accuracy of a target region recognition result corresponding to the image content.

Figure 9:
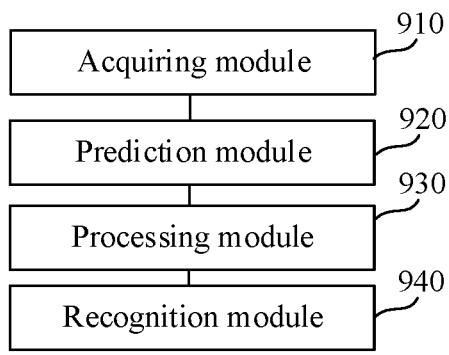
FIG. 9 is a structural block diagram of a region recognition apparatus according to an exemplary embodiment of this application.

FIG. 9 is a structural block diagram of a region recognition apparatus according to an exemplary embodiment of this application. As shown in FIG. 9, the apparatus includes:

an acquiring module 910, configured to acquire an input image, the input image including image content of a to-be-recognized region;

a prediction module 920, configured to acquire a first rotation angle of the image content in the input image, the first rotation angle being estimated by using a recognition model, and the first rotation angle being used for indicating a tilt angle of the image content in the input image relative to a reference angle;

a processing module 930, configured to rotate a convolution kernel in the recognition model at the first rotation angle, and perform convolution processing on an image feature of the input image at the rotated convolution kernel to obtain a target feature; and a recognition module 940, configured to recognize the target feature to obtain region data corresponding to the image content; and determine, in the input image by using the region data, a target region corresponding to the image content.

In an exemplary embodiment, there are at least two types of convolution kernels, and the processing module 930 is further configured to rotate the at least two types of convolution kernels at the first rotation angle; and perform convolution processing on the image feature of the input image by using the at least two types of rotated convolution kernels to obtain the target feature.

In an exemplary embodiment, the processing module 930 is further configured to perform convolution processing on the image feature of the input image by using the at least two rotated convolution kernels to obtain at least two rotational convolution features, one convolution kernel corresponding to one rotational convolution feature.

Figure 10:
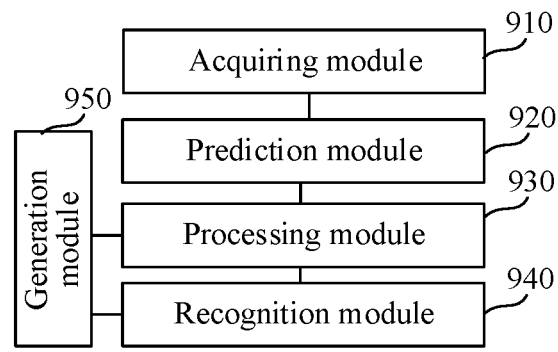
FIG. 10 is a structural block diagram of a region recognition apparatus according to another exemplary embodiment of this application.

As shown in FIG. 10, the apparatus further includes:

a generation module 950, configured to perform convolution on the at least two rotational convolution features by using an attention mechanism to generate at least two attention maps, one attention map corresponding to one rotational convolution feature; and generate the target feature with reference to the at least two rotational convolution features and the at least two attention maps.

In an exemplary embodiment, the generation module 950 is further configured to normalize the at least two attention maps to obtain at least two normalized maps, one normalized map corresponding to one rotational convolution feature; summate products of the at least two rotational convolution features and the corresponding normalized maps to obtain a summation feature; and perform convolution processing on the summation feature to generate the target feature.

In an exemplary embodiment, one attention map includes one attention value corresponding to each pixel, and the generation module 950 is further configured to determine, in the at least two attention maps, at least two attention values corresponding to one pixel; determine, from a rotational convolution feature corresponding to a target attention map, a sub-feature corresponding to the pixel, the target attention map being an attention map in which a maximum attention value is located, and the maximum attention value being a maximum value of the at least two attention values; and generate the target feature based on the sub-feature corresponding to each pixel.

In an exemplary embodiment, the region data includes the first rotation angle, and the recognition module 940 is further configured to recognize the target feature to obtain size data and location data that are corresponding to the image content; and determine the first rotation angle, the size data, and the location data as the region data corresponding to the image content.

In an exemplary embodiment, the region data includes a second rotation angle, and the recognition module 940 is further configured to recognize the target feature to obtain a second rotation angle, size data, and location data that are corresponding to the image content; and determine the second rotation angle, the size data, and the location data as the region data corresponding to the image content.

In an exemplary embodiment, the location data includes central point data and an offset value.

The prediction module 920 is further configured to predict a central point of the image content by using the target feature to obtain the central point data; and predict, by using the target feature, an offset of the central point in an image feature scaling process to obtain the offset value.

In an exemplary embodiment, the recognition module 940 is further configured to select a central location from the input image according to the central point data and the offset value; determine a first region in the input image based on the central location and the size data; and rotate the first region according to the rotation angle included in the region data to obtain the target region corresponding to the image content.

In conclusion, according to the region recognition apparatus provided in this embodiment, after a rotation angle of image content is determined by using a recognition model, an image feature of an input image is processed in a rotational convolution manner, so as to recognize a target region corresponding to the image content in the input image. In this manner, the target region is a region obtained in the rotational convolution manner, and the rotation angle is combined in a process of recognizing the target region corresponding to the image content, thereby improving recognition accuracy of the target region corresponding to the image content.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The region recognition apparatus provided in the foregoing embodiments is illustrated with an example of division of the foregoing functional modules. In actual application, the functions can be allocated to and completed by different functional modules according to requirements, that is, the internal structure of the device is divided into different functional modules to implement all or some of the functions described above. In addition, the region recognition apparatus provided in the foregoing embodiment and the region recognition method embodiment belong to the same concept. For a specific implementation process of the region recognition apparatus, refer to the method embodiment. Details are not described herein again.

Figure 11:
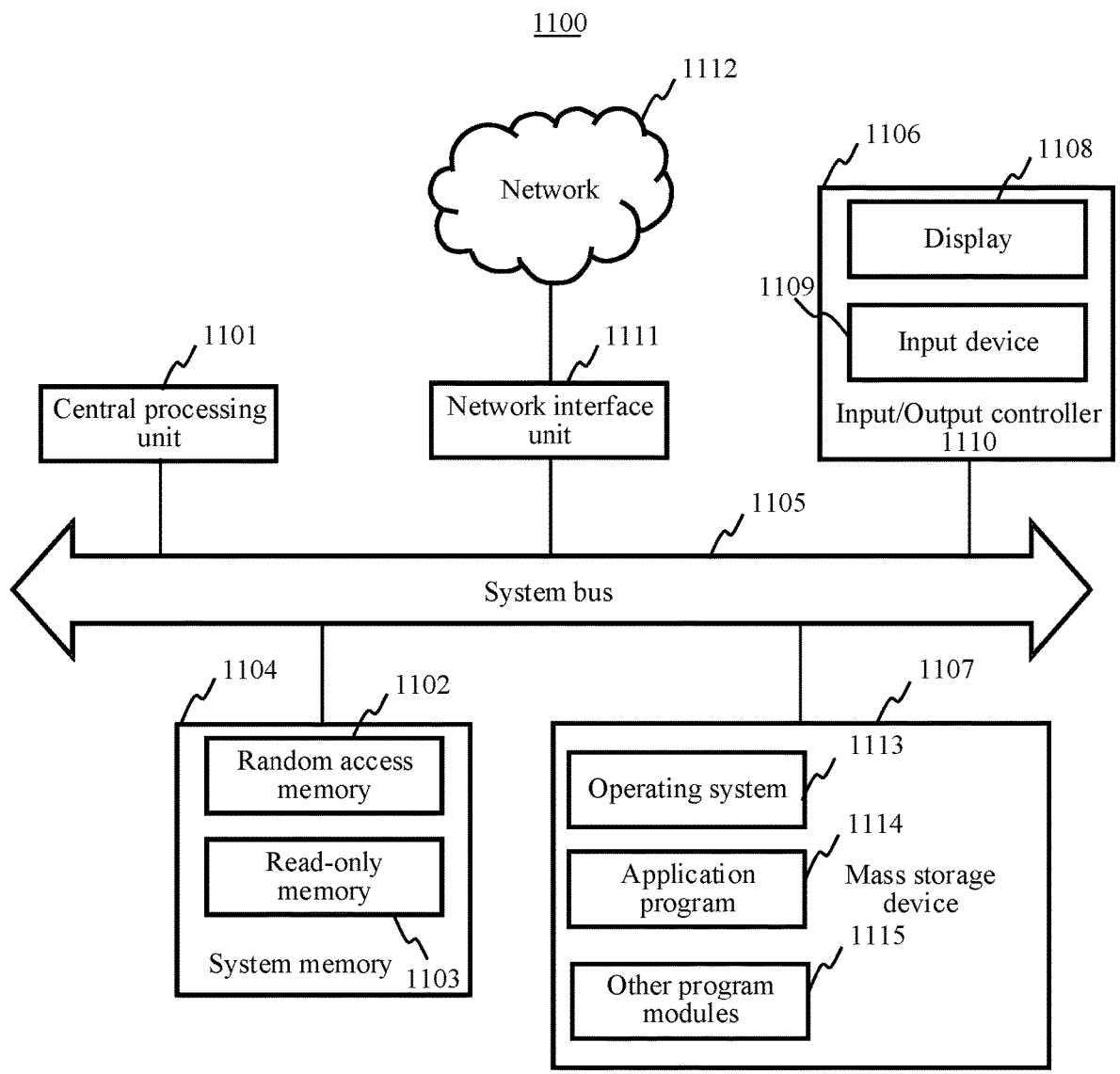
FIG. 11 is a structural block diagram of a server according to an exemplary embodiment of this application.

FIG. 11 is a schematic structural diagram of a server according to an exemplary embodiment of this application.

Specifically, the server 1100 includes a central processing unit (CPU) 1101, a system memory 1104 including a random access memory (RAM) 1102 and a read-only memory (ROM) 1103, and a system bus 1105 connecting the system memory 1104 to the CPU 1101. The server 1100 further includes a basic input/output system (I/O system) 1106 assisting in transmitting information between devices in a computer, and a mass storage device 1107 configured to store an operating system 1113, an application program 1114 and another program module 1115.

The basic I/O system 1106 includes a display 1108 configured to display information and an input device 1109, such as a mouse or a keyboard, configured to input information for a user. The display 1108 and the input device 1109 are both connected to the CPU 1101 by using an input/output controller 1110 connected to the system bus 1105. In some embodiments, the basic I/O system 1106 further includes the input/output controller 1110 configured to receive and process inputs from a plurality of other devices such as a keyboard, a mouse, and an electronic stylus. Similarly, the input/output controller 1110 further provides an output to a display screen, a printer or another type of output device.

The mass storage device 1107 is connected to the central processing unit 1101 by using a mass storage controller (not shown) connected to the system bus 1105. The mass storage device 1107 and a computer-readable medium associated with the mass storage device 1107 provide non-volatile storage for the server 1100. That is, the mass storage device 1107 can include a computer-readable medium (not shown) such as a hard disk or a compact disc read-only memory (CD-ROM) drive.

Generally, the computer-readable medium includes a computer storage medium and a communication medium. The computer storage medium includes volatile and non-volatile, removable and non-removable media implemented by using any method or technology for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, persons skilled in art can know that the computer storage medium is not limited to the foregoing several types. The system memory 1104 and the large-capacity storage device 1107 can be collectively referred to as a memory.

According to various embodiments of this application, the server 1100 can further be connected, by using a network such as the Internet to a remote computer on the network and run. That is, the server 1100 can be connected to a network 1112 by using a network interface unit 1111 that is connected to the system bus 1105, or can be connected to a network of another type or a remote computer system (not shown) by using the network interface unit 1111.

The memory further includes one or more programs, which are stored in the memory and are configured to be executed by the CPU.

An embodiment of this application further provides a computer device, including a processor and a memory, the memory storing at least one instruction, at least one segment of program, a code set, or an instruction set, and the at least one instruction, at least one segment of program, code set, or instruction set being loaded and executed by the processor to enable the computer device to implement the region recognition method according to the foregoing various method embodiments.

An embodiment of this application further provides a non-transitory computer-readable storage medium is provided, storing at least one instruction, at least one segment of program, a code set, or an instruction set, and the at least one instruction, at least one segment of program, code set, or instruction set being loaded and executed by a processor to enable a computer to implement the region recognition method according to the foregoing various method embodiments.

Exemplarily, the non-transitory computer-readable storage medium includes: a read-only memory (ROM), a random access memory (RAM), a solid state drive (SSD), an optical disc, or the like. In some embodiments, the RAM may include a resistance random access memory (ReRAM) and a dynamic random access memory (DRAM). The sequence numbers of the foregoing embodiments of this application are merely for description purpose, and are not intended to indicate the preference among the embodiments.

A person of ordinary skill in the art can understand that all or some of the steps to implement the foregoing embodiments are completed by hardware, or by a program instructing related hardware, and the program can be stored in a non-transitory computer readable storage medium. In some embodiments, the non-transitory computer readable storage medium is a read-only memory, a magnetic disk, an optical disc, or the like.

An embodiment of this application further provides a computer program or a computer program product. When the computer program or the computer program product runs on a computer, the computer performs the region recognition method according to the foregoing various method embodiments.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A region recognition method, performed by a computer device and comprising:
    acquiring an input image, the input image comprising image content of a to-be-recognized region;
    acquiring a first rotation angle of the image content in the input image, the first rotation angle being estimated by a recognition model, and the first rotation angle representing a tilt angle of the image content in the input image relative to a reference angle;
    rotating a plurality of convolution kernels of a plurality of network branches in the recognition model at the first rotation angle before the plurality of network branches converges, wherein the convolution kernels are of different types and are separately obtained for each of the plurality of network branches;
    performing convolution processing on an image feature of the input image using the rotated convolution kernels to obtain a target feature;
    recognizing the target feature to obtain region data corresponding to the image content; and determining, in the input image by using the region data, a target region corresponding to the image content.

2. The method according to claim 1, wherein rotating the plurality of convolution kernels in the recognition model at the first rotation angle comprises: rotating at least two types of convolution kernels at the first rotation angle; and
wherein performing convolution processing on the image feature of the input image using the rotated convolution kernels to obtain a target feature comprises: performing convolution processing on the image feature of the input image by using the at least two types of rotated convolution kernels to obtain the target feature.

3. The method according to claim 2, wherein performing the convolution processing on the image feature of the input image by using the at least two types of rotated convolution kernels to obtain the target feature comprises:
performing the convolution processing on the image feature of the input image by the at least two types of rotated convolution kernels to obtain at least two rotational convolution features, one convolution kernel corresponding to one rotational convolution feature;
performing the convolution on the at least two rotational convolution features by an attention mechanism to generate at least two attention maps, one attention map corresponding to one rotational convolution feature; and
generating the target feature with reference to the at least two rotational convolution features and the at least two attention maps.

4. The method according to claim 3, wherein generating the target feature with reference to the at least two rotational convolution features and the at least two attention maps comprises:
normalizing the at least two attention maps to obtain at least two normalized maps, one normalized map corresponding to one rotational convolution feature;
summating products of the at least two rotational convolution features and the corresponding normalized maps to obtain a summation feature; and
performing convolution processing on the summation feature to generate the target feature.

5. The method according to claim 3, wherein each attention map of the at least two attention maps comprises one attention value corresponding to each pixel of the image content, and generating the target feature with reference to the at least two rotational convolution features and the at least two attention maps comprises:
determining, in the at least two attention maps, at least two attention values corresponding to one pixel;
determining, from a rotational convolution feature corresponding to a target attention map, a sub-feature corresponding to the pixel, the target attention map being an attention map in which a maximum attention value is located, and the maximum attention value being a maximum value of the at least two attention values; and
generating the target feature based on the sub-feature corresponding to each pixel.

6. The method according to claim 1, wherein recognizing the target feature to obtain the region data corresponding to the image content comprises:
recognizing the target feature to obtain size data and location data corresponding to the image content; and
wherein the region data comprises the first rotation angle, the size data, and the location data.

7. The method according to claim 1, wherein the region data comprises a second rotation angle, and recognizing the target feature to obtain the region data corresponding to the image content comprises:
recognizing the target feature to obtain a second rotation angle, size data, and location data corresponding to the image content; and
determining the second rotation angle, the size data, and the location data as the region data corresponding to the image content.

8. The method according to claim 7, wherein the location data comprises central point data and an offset value; and
wherein the method further comprises:
estimating a central point of the image content by using the target feature to obtain the central point data; and
estimating, by using the target feature, an offset of the central point in an image feature scaling process to obtain the offset value.

9. The method according to claim 8, wherein determining, in the input image by using the region data, the target region corresponding to the image content comprises:
selecting a central location from the input image according to the central point data and the offset value;
determining a first region in the input image based on the central location and the size data; and
rotating the first region according to the rotation angle comprised in the region data to obtain the target region corresponding to the image content.

10. A computer device, comprising a processor and a memory in communication with the processor, the memory storing at least one instruction, at least one segment of program, a code set, or an instruction set, and the processor being configured to load and execute the at least one instruction, at least one segment of program, code set, or instruction set to cause the computer device to perform steps comprising:
acquiring an input image, the input image comprising image content of a to-be-recognized region;
acquiring a first rotation angle of the image content in the input image, the first rotation angle being estimated by a recognition model, and the first rotation angle representing a tilt angle of the image content in the input image relative to a reference angle;
rotating all of a plurality of convolution kernels of a plurality of network branches in the recognition model at the first rotation angle before the plurality of network branches converges, wherein the convolution kernels are of different types and are separately obtained for each of the plurality of network branches;
performing convolution processing on an image feature of the input image using the rotated convolution kernels to obtain a target feature;
recognizing the target feature to obtain region data corresponding to the image content; and
determining, in the input image by using the region data, a target region corresponding to the image content.

11. The computer device of claim 10, wherein the processor is further configured to cause the computer device to:
rotate the plurality of convolution kernels in the recognition model at the first rotation angle by rotating at least two types of convolution kernels at the first rotation angle; and
perform convolution processing on the image feature of the input image using the rotated convolution kernels to obtain a target feature by performing convolution processing on the image feature of the input image by using the at least two types of rotated convolution kernels to obtain the target feature.

12. The computer device of claim 11, wherein the processor is further configured to cause the computer device to perform convolution processing on the image feature of the input image by using the at least two types of rotated convolution kernels to obtain the target feature by:
performing the convolution processing on the image feature of the input image by the at least two types of rotated convolution kernels to obtain at least two rotational convolution features, one convolution kernel corresponding to one rotational convolution feature;
performing the convolution on the at least two rotational convolution features by an attention mechanism to generate at least two attention maps, one attention map corresponding to one rotational convolution feature; and
generating the target feature with reference to the at least two rotational convolution features and the at least two attention maps.

13. The computer device of claim 12, wherein the processor is further configured to cause the computer device to generate the target feature with reference to the at least two rotational convolution features and the at least two attention maps by:
normalizing the at least two attention maps to obtain at least two normalized maps, one normalized map corresponding to one rotational convolution feature;
summating products of the at least two rotational convolution features and the corresponding normalized maps to obtain a summation feature; and
performing convolution processing on the summation feature to generate the target feature.

14. The computer device of claim 12, wherein each attention map of the at least two attention maps comprises one attention value corresponding to each pixel of the image content, and the processor is further configured to cause the computer device to generate the target feature with reference to the at least two rotational convolution features and the at least two attention maps by:
determining, in the at least two attention maps, at least two attention values corresponding to one pixel;
determining, from a rotational convolution feature corresponding to a target attention map, a sub-feature corresponding to the pixel, the target attention map being an attention map in which a maximum attention value is located, and the maximum attention value being a maximum value of the at least two attention values; and
generating the target feature based on the sub-feature corresponding to each pixel.

15. The computer device of claim 10, wherein the processor is further configured to cause the computer device to recognize the target feature to obtain the region data corresponding to the image content by:
recognizing the target feature to obtain size data and location data that are corresponding to the image content; and
wherein the region data comprises the first rotation angle, the size data, and the location data.

16. The computer device of claim 10, wherein the region data comprises a second rotation angle the processor is further configured to cause the computer device to recognize the target feature to obtain the region data corresponding to the image content by:
recognizing the target feature to obtain a second rotation angle, size data, and location data corresponding to the image content; and
determining the second rotation angle, the size data, and the location data as the region data corresponding to the image content.

17. The computer device of claim 16, wherein the location data comprises central point data and an offset value and the processor is further configured to cause the computer device to perform steps comprising:
estimating a central point of the image content by using the target feature to obtain the central point data; and
estimating, by using the target feature, an offset of the central point in an image feature scaling process to obtain the offset value.

18. The computer device of claim 17, the processor is further configured to cause the computer device to determine, in the input image by using the region data, the target region corresponding to the image content by:
selecting a central location from the input image according to the central point data and the offset value;
determining a first region in the input image based on the central location and the size data; and
rotating the first region according to the rotation angle comprised in the region data to obtain the target region corresponding to the image content.

19. A non-transitory computer-readable storage medium, storing at least one instruction, at least one segment of program, a code set, or an instruction set, and the at least one instruction, at least one segment of program, code set, or instruction set being loaded and executed by a processor to cause a computer device to perform steps comprising:
acquiring an input image, the input image comprising image content of a to-be-recognized region;
acquiring a first rotation angle of the image content in the input image, the first rotation angle being estimated by a recognition model, and the first rotation angle representing a tilt angle of the image content in the input image relative to a reference angle;
rotating a plurality of convolution kernels of a plurality of network branches in the recognition model at the first rotation angle before the plurality of network branches converges, wherein the convolution kernels are of different types and are separately obtained for each of the plurality of network branches;
performing convolution processing on an image feature of the input image using the rotated convolution kernels to obtain a target feature;
recognizing the target feature to obtain region data corresponding to the image content; and
determining, in the input image by using the region data, a target region corresponding to the image content.

20. The non-transitory computer-readable storage medium of claim 19, wherein the at least one instruction, at least one segment of program, code set, or instruction set is loaded and executed by a processor to cause a computer device to:
rotate the plurality of convolution kernels in the recognition model at the first rotation angle by rotating at least two types of convolution kernels at the first rotation angle; and
perform convolution processing on the image feature of the input image using the rotated convolution kernels to obtain a target feature by
performing convolution processing on the image feature of the input image by using the at least two types of rotated convolution kernels to obtain the target feature.

* * * * *